United States Patent
Wang et al.

(10) Patent No.: US 12,112,110 B2
(45) Date of Patent: Oct. 8, 2024

(54) MULTI-PHYSICS CO-SIMULATION METHOD OF POWER SEMICONDUCTOR MODULES

(71) Applicants: Huazhong University of Science and Technology, Wuhan (CN); Shenzhen Union Semiconductor Co., LTD, Shenzhen (CN)

(72) Inventors: Zhiqiang Wang, Wuhan (CN); Yayong Yang, Wuhan (CN); Yuxin Ge, Wuhan (CN); Guoqing Xin, Wuhan (CN); Xiaojie Shi, Shenzhen (CN)

(73) Assignees: Huazhong University of Science and Technology, Wuhan (CN); Shenzhen Union Semiconductor Co., LTD, Shenzhen (CN)

( * ) Notice: Subject to any disclaimer, the term of this patent is extended or adjusted under 35 U.S.C. 154(b) by 198 days.

(21) Appl. No.: 17/890,354

(22) Filed: Aug. 18, 2022

(65) Prior Publication Data
US 2023/0057941 A1 Feb. 23, 2023

(30) Foreign Application Priority Data
Aug. 20, 2021 (CN) .......................... 202110963062.2

(51) Int. Cl.
*G06F 30/367* (2020.01)
*G06F 30/31* (2020.01)
*G06F 30/398* (2020.01)

(52) U.S. Cl.
CPC ............ *G06F 30/367* (2020.01); *G06F 30/31* (2020.01); *G06F 30/398* (2020.01)

(58) Field of Classification Search
CPC .................................................. G06F 30/367
USPC ......................................................... 716/106
See application file for complete search history.

(56) References Cited

FOREIGN PATENT DOCUMENTS

| CN | 103579142 A | 2/2014 |
|----|-------------|--------|
| CN | 103681552 A | 3/2014 |
| CN | 104537193 A | 4/2015 |
| CN | 106484928 A | 3/2017 |
| CN | 110598317 A | 12/2019 |

OTHER PUBLICATIONS

Nguyen et al., "Co-simulation of Interconnected Power Electronics using Simulink-PSpice Interface and Components Defined in C/C ++ and SystemC," The MathWorks, Inc, 2016, pp. 1-38 (Year: 2016).*

* cited by examiner

*Primary Examiner* — Eric D Lee
(74) *Attorney, Agent, or Firm* — Nitin Kaushik

(57) ABSTRACT

The present invention belongs to the technical field of simulation of power semiconductor modules, and discloses a multi-physics co-simulation method of a power semiconductor module. The multi-physics co-simulation method of the power semiconductor module comprises: adopting professional circuit simulation software PSpice supporting a spice model to be imported into a device, and by designing a specific collaborative analysis method and performing secondary development of a software data exchange interface, i.e. constructing a coupling interface of co-simulation, performing electricity-heat-force co-simulation of two types of software PSpice and COMSOL by adopting an indirect coupling manner. The simulation time is greatly shortened, and the simulation efficiency is improved.

3 Claims, 9 Drawing Sheets

MULTI-PHYSICS CO-SIMULATION METHOD OF POWER SEMICONDUCTOR MODULES

CROSS-REFERENCE TO RELATED APPLICATIONS

The application claims priority to Chinese patent application No. 2021109630622, filed on Aug. 20, 2021, the entire contents of which are incorporated herein by reference.

TECHNICAL FIELD

The present invention belongs to the technical field of simulation of power semiconductor modules, and particularly relates to a multi-physics co-simulation method of a power semiconductor module.

BACKGROUND

At present, with rapid development of applications of new energy automobiles, rail traffic, aerospace and so on, a power electronic converter serves as a core unit of power transmission, and the status and the significance thereof are increasingly obvious. A power semiconductor module serves as a basic switch unit of a high-power power electronic converter, and the reliability thereof has a decisive influence on the reliability of the converter. The power semiconductor module is a variable complex coupling system combining multi-physics and multiple time scales, and is modeled and simulated through comprehensive consideration from the dimensionalities of the multi-physics, the interaction of the multiple time scales, and so on. Due to the complexity of the interaction of the multi-physics coupling and the multi-time scales, an accurate and effective multi-physics co-simulation method of the power semiconductor module is still lacked at present.

The simulation of physical fields of electricity, heat, force and so on of the power semiconductor module needs corresponding simulation software. Circuit simulation generally uses circuit simulation software, such as PSpice, LTspice, Saber, Simulink and the like, and heat-force simulation needs to use finite element simulation software, such as COMSOL Multiphysics, ANSYS and the like. Although the commercial software COMSOL and ANSYS have powerful multi-physics simulation capability, when the software COMSOL and ANSYS are applied in the multi-physics co-simulation of the power semiconductor module, the software COMSOL and ANSYS still have the following problems:

Circuit simulation software ANSYS Twin Builder in the ANSYS has the problem of compatibility with a spice model of a device provided by a device manufacturer, and many device models cannot be used. Although a behavior model of the device can be self-constructed in the ANSYS Twin Builder according to a data book provided by the manufacturer, the requirement on modeling capability is higher, and the construction is time-consuming and energy-consuming.

A thermal network model in the ANSYS Twin Builder is accurately established only for an LTI (Linear Time Invariant) system based on an electricity-heat analogy. However, an actual thermal system of the power semiconductor module is not the LTI system basically, only an approximate solution can be obtained by using a thermal network method of the electricity-heat analogy, and the simulation precision of the thermal network model based on a model reduction technology is not high.

Due to the limit to the number of nodes of an RC (Resistance-Capacitance) thermal network, the temperature distribution obtained by calculation is discontinuous. Therefore, the thermal network is usually used for predicting the temperature of the nodes and is not suitable for being coupled with a stress field to solve thermal stress.

A circuit simulation module in the COMSOL, i.e. an AC/DC (Alternating Current/Direct Current) module, does not support the spice model to be imported into the device; and the circuit simulation capacity thereof is limited, the simulation precision is low, and the circuit simulation module cannot be coupled with a solid-fluid heat transfer module and a structural mechanics module in the COMSOL directly.

When a single multi-physics simulation software platform is used for performing multi-physics co-simulation of electricity, heat and force, the difference of the time scales of the circuit simulation and the finite element simulation is huge, and the own circuit simulation capacity of the software is limited. Scholars at home and abroad propose various methods to solve the problems: 1, a switching process is simplified, and a fixed loss value obtained by formula derivation and calculation is taken as a boundary condition of heat-force simulation; 2, a mathematical expression of a loss and time relationship, which is obtained according to fitting, is taken as the heat consumption rate of the heat-force simulation; and 3, the circuit simulation is performed firstly, the power loss of the device is obtained according to an integral of a circuit simulation result, and then the loss of the device is taken as the heat consumption rate to perform the heat-force simulation in the finite element simulation software. According to the methods, the circuit simulation is simplified, and a tight coupling relationship among electricity, heat and force in the simulation process is neglected; and the coupling manner is unidirectional sequential coupling, and bidirectional sequential coupling between electricity and heat cannot be realized, thereby greatly reducing the precision of multi-physics simulation. Although a scholar proposes a multi-physics co-simulation method of a power semiconductor module through collaboration of the finite element simulation software and circuit software, due to the lack of an effective step length adjustment strategy, the problem that the simulation time is too long exists; in the methods, the problem of non-uniform junction temperature distribution of different devices is not considered, thereby reducing the simulation precision to some extent; and additionally, according to the methods, only transient multi-physics simulation between different types of software is performed, and steady-state multi-physics co-simulation between the different types of software is not realized.

Through the above analysis, the prior art has the following problems and defects: the existing simulation technology is not high in simulation precision and simulation efficiency, cannot realize effective comprehensive simulation, and cannot realize the steady-state multi-physics co-simulation between the different types of software.

The difficulties of solving the above problems and overcoming the above defects are: the simulation capacity of the single simulation software is limited, the precision of the multi-physics simulation is not high, and the different types of software need to be used for performing simulation of corresponding physical fields. A complex coupling relationship exists among the multiple physical fields of the power semiconductor module, and a multi-physics simulation mechanism of the power semiconductor module needs to be researched to determine a coupling variable which is transferred for realizing co-simulation between the different types of software, so as to perform accurate multi-physics simulation. Additionally, as a heterogeneous system exists between the different types of software, in order to realize programmed automatic co-simulation, a software coupling interface of the co-simulation between the different types of software needs to be developed to realize automated data exchange; and the development of the software coupling interface needs a developer to perform an in-depth research on an architecture between the different types of software and sufficiently understand program development languages of the different types of software. The huge difference of the time scales between the infinite element heat-force simulation and the circuit simulation bring a huge challenge for the co-simulation between the different types of software, and an appropriate co-simulation coupling strategy is required to solve the problem. In the aspect of the simulation efficiency, due to the adoption of a fixed step length of data exchange, the simulation precision and the simulation efficiency are difficult to balance; and the step length of data exchange of the simulation needs to be adjusted dynamically, and the changing speed of the coupling variable needs to be considered comprehensively. However, the coupling variable is changed dynamically along with the simulation process, which is an irregular changing process, and it is difficult to establish an accurate expression of changing along with time to judge the changing speed of the coupling variable.

The meanings of solving the above problems and overcoming the above defects are: by solving the above problems, the co-simulation between the PSpice and the COMSOL can be realized, thereby breaking through the limit of the single simulation software, realizing a transient simulation research between the different types of software, performing a steady-state simulation research, improving the precision and efficiency of the multi-physics simulation of the power semiconductor module and providing the theoretical basis and the technical support for subsequent researches of a distribution law of electricity, heat and force and an invalidation/aging mechanism of the power semiconductor module.

SUMMARY

For the problems existing in the prior art, the present invention provides a multi-physics co-simulation method of a power semiconductor module.

The present invention is realized as follows: the multi-physics co-simulation method of the power semiconductor module comprises:

adopting a circuit simulator supporting the device behavior model to perform circuit simulation, and by designing a specific collaborative analysis method and performing secondary construction of a coupling interface of co-simulation of the software, performing electricity-heat-force co-simulation of different types of software by adopting an indirect coupling manner.

Further, wherein the coupling interface of the co-simulation comprises:

a circuit model constructed by using a spice language in PSpice, a thermal-mechanical model constructed by using a java language in COMSOL and a control script file constructed in a MATLAB (Matrix Laboratory);

different types of software comprise two types of software PSpice and COMSOL; and the step of performing the electricity-heat-force co-simulation comprises:

performing circuit simulation of the PSpice and heat-force simulation of the COMSOL, processing data obtained by simulation by utilizing the coupling interface of the co-simulation and based on a MATLAB script program, coordinating data transfer between a circuit simulation result of the PSpice and a heat-force simulation result of the COMSOL and performing co-simulation between the PSpice and the COMSOL;

the step of performing the heat-force simulation of the COMSOL comprises:

constructing a heat-force model by using a java language and combining COMSOL Multiphysics 5.6 with MATLAB;

performing COMSOL simulation by adopting a manner of saving the heat-force model as a file with a suffix of .m, and controlling a simulation process by utilizing the MATLAB; drawing a geometric figure by adopting SOLIDWORKS and importing a CAD (Computer Aided Design) model into the COMSOL; and setting the heat consumption rate of a heat source as a variable and updating a parameter of the heat consumption rate when in data exchange with the PSpice every time; and dividing grids manually, setting a steady-state type and a transient type, taking a steady-state solved result as an initial value of transient simulation, performing infinite element calculation, extracting junction temperature of the device and feeding back the junction temperature of the device into the circuit simulation.

Further, wherein the step of processing the data obtained by the simulation by utilizing the coupling interface of the co-simulation and based on the MATLAB script program comprises:

extracting simulation data of the PSpice by the MATLAB: reading and writing a spice circuit simulation program saved as a text file and written in advance by adopting a file reading and writing function by the MATLAB, so as to obtain power loss data, circuit simulation data and other data included in the text file; and screening the data by adopting a regular expression to obtain screened loss data, extracting the loss of the device corresponding to time points at equal intervals, and obtaining the average loss of each device within the time step length of data exchange by adopting a method of calculus division and summation; and extracting simulation data of the COMSOL by the MATLAB: setting a temperature probe to obtain a temperature data table of the device, and reading junction temperature data in the data table by using an integrated MATLAB function; and updating corresponding temperature parameters in a power device model file with a suffix of .lib through a file reading and writing command by utilizing the collected temperature data by the MATLAB; and the step of reading and writing the spice circuit simulation program saved as the text file and written in advance by adopting the file reading and writing function by the MATLAB comprises:

firstly, obtaining a PSpice circuit simulation input file with a suffix of .cir; controlling the input file with the suffix of .cir to be executed in PSpice AD, setting the time step lengths in the input .cir file to be equal, and performing PSpice circuit simulation; automatically generating an output file with a suffix of .out, and obtaining the power loss data corresponding to the time points at equal intervals in different devices based on the output .out file; and converting the .out file into a text file by the file reading and writing command.

Further, wherein the step of coordinating data transfer between the circuit simulation result of the PSpice and the heat-force simulation result of the COMSOL comprises: transmitting the loss data obtained by calculation into the COMSOL by the MATLAB, updating the heat consumption rate of the heat source and changing a boundary condition of heat-force simulation.

Further, wherein the step of performing the electricity-heat-force co-simulation of the two types of software PSpice and COMSOL by adopting an indirect coupling manner comprises the following steps:

firstly, calculating the circuit model and taking the power loss of the device, which is obtained by the circuit simulation, as a boundary condition of transient heat-force simulation; next, performing the transient heat-force simulation in the COMSOL; finally, taking the junction temperature of each device, which is obtained by the heat-force simulation, as a boundary condition of next circuit simulation; and performing constant iterative loop until a condition of loop termination is met.

Further, wherein the multi-physics co-simulation method of the power semiconductor module comprises the following steps:

step 1, predefining parameters, performing the circuit simulation under the given initial temperature in the PSpice, and suspending the circuit simulation when the preset step length of data exchange is reached;

step 2, calculating the power loss data by adopting the power loss calculation method in the MATLAB, and transmitting the power loss data into the COMSOL;

step 3, performing the heat-force simulation in the COMSOL, and suspending the heat-force simulation when the preset step length of data exchange is reached;

step 4, feeding back the extracted parameter of the junction temperature to the circuit model of the PSpice by the MATLAB; and taking the parameter of the junction temperature as a new initial value, and continuing to perform simulation of the next time step length of data exchange based on the former state; and step 5, taking the state when a former loop is terminated as the initial state of a next loop, iterating to perform dynamic continuous multi-physics simulation, and terminating co-simulation when an iteration termination condition is met.

Further, wherein the multi-physics co-simulation method of the power semiconductor module further comprises:

enabling the time step length of data exchange of the PSpice and the COMSOL to be equal to the time step length of data exchange of the COMSOL and the PSpice; and setting different time step lengths of data exchange to control the rate of the circuit simulation and the rate of the heat-force simulation, and performing multi-rate multi-physics coupling simulation;

the step of setting the different time step lengths of data exchange comprises: dynamically calculating a first-order derivative of a Lagrange interpolation function of a temperature coupling variable, and dynamically adjusting the time step length of data exchange according to an adaptive adjustment strategy of the time step length;

the step of setting the different time step lengths of data exchange comprises the following steps:

constructing a first-order variable step length three-point numerical differentiation formula based on a Lagrange function by extracting and iterating numerical solutions of temperature coupling state variables of nodes, and calculating and obtaining a first-order derivative of an interpolation function of a current node:

$$L'_n(t_i) = \frac{\lambda_i}{\lambda_{i-1}(\lambda_{i-1} + \lambda_i)} T(t_{i-2}) - \frac{\lambda_{i-1} + \lambda_i}{\lambda_{i-1}\lambda_i} T(t_{i-1}) + \frac{\lambda_{i-1} + 2\lambda_i}{\lambda_i(\lambda_{i-1} + \lambda_i)} T(t_i)$$

wherein $t_{i-2}$, $t_{i-1}$, $t_i$ represent three adjacent continuous data exchange time points; $t_i$ represents a current time node; the relational expressions: $t_{i-1}=t_{i-2}+\lambda_{i-1}$, and $t_i=t_{i-2}+\lambda_{i-1}+\lambda_i$ are met; and $T(t_{i-2})$, $T(t_{i-1})$ and $T(t_i)$ represent corresponding numerical solutions of temperature at $t_{i-2}$, $t_{i-1}$, $t_i$; and a step length adjustment strategy is established according to the first-order derivative of the interpolation function of the current node; and a step length decision interval is set as $[\varepsilon_1, \varepsilon_2]$, and step length adjustment coefficients are set as a and b respectively, wherein $a \in (0,1)$, $b \in (1,+\infty)$, and the following conditions are met:

(1) if $|L'_n(t_i)| \in [\varepsilon_1, \varepsilon_2]$, $\lambda_{i+1} = \lambda_i$;
(2) if $|L'_n(t_i)| \leq \varepsilon_1$, $\lambda_{i+1} = \lambda_i \times b$; and the time step length of data exchange is appropriately increased; and
(3) if $|L'_n(t_i)| \geq \varepsilon_2$, $\lambda_{i+1} = \lambda_i \times a$; and the step length is decreased.

Another purpose of the present invention is to provide a multi-physics co-simulation system of a power semiconductor module for implementing the multi-physics co-simulation method of the power semiconductor module.

Another purpose of the present invention is to provide an information data processing terminal, which comprises a memory and a processor; a computer program is stored in the memory; and when the computer program is executed by the processor, the processor is configured to execute the multi-physics co-simulation method of the power semiconductor module.

Through combination of all the above technical solutions, the present invention has the following advantages and positive effects: the present invention provides the multi-physics co-simulation method of the power semiconductor module based on PSpice-MATLAB-COMSOL, so that the co-simulation between different types of software is realized.

In the present invention, the advantages of the circuit simulation software PSpice and the infinite element simulation software COMSOL are combined, and the coupling simulation of a field and a circuit is realized; a tight coupling relationship among electricity, heat and force is considered, the real-time bidirectional coupling among electricity, heat and force is realized, and the simulation precision is improved; the step length is adaptive, so that the simulation time is shortened greatly, and the simulation efficiency is improved; the spice model of the device is rewritten, so that different types of junction temperature feedback are realized, the problem of non-uniform temperature distribution of different devices is considered, and the simulation precision is improved; and by virtue of an adaptive step length adjustment strategy and a multi-physics coupling strategy, the transient and steady-state multi-physics co-simulation between different types of software is realized, and the application scope of the present invention is enlarged.

DETAILED DESCRIPTION OF THE EMBODIMENTS

For the problems existing in the prior art, the present invention provides a multi-physics co-simulation method of a power semiconductor module. The present invention is described in details hereinafter through combination with the drawings.

Figure 1:
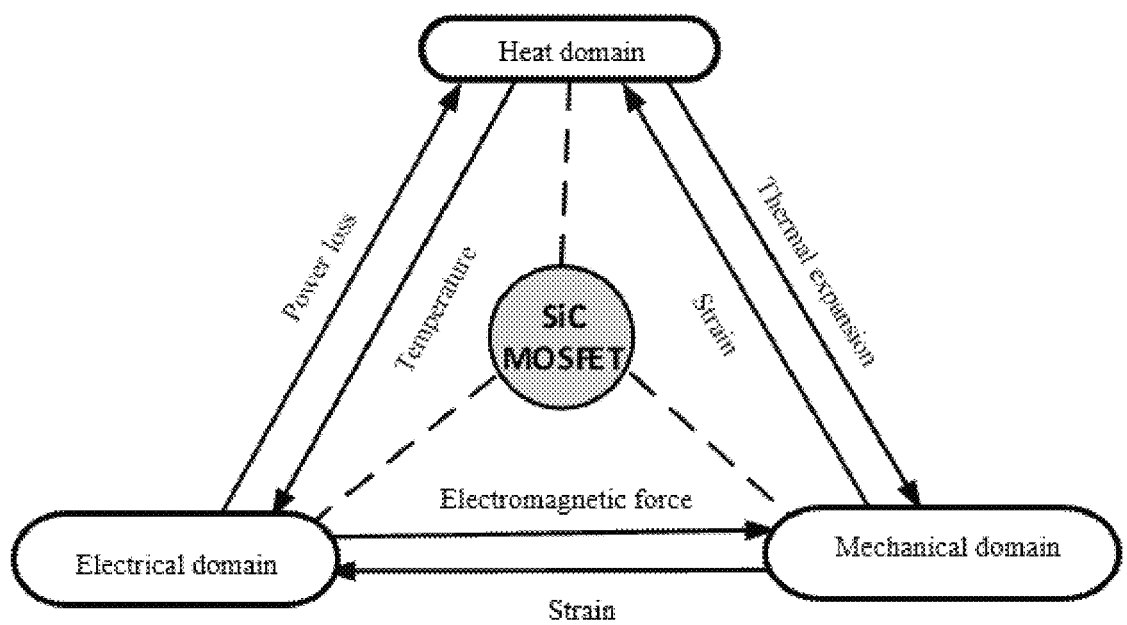
FIG. 1 is a schematic diagram of a multi-physics co-simulation method of a power semiconductor module, which is provided by an embodiment of the present invention.

As shown in FIG. 1, a multi-physics co-simulation method of a power semiconductor module, which is provided by an embodiment of the present invention comprises:
   adopting professional circuit simulation software PSpice supporting a spice model to be imported into a device, and by designing a specific collaborative analysis method and performing secondary development of a software data exchange interface, i.e.
   constructing a coupling interface of co-simulation, performing electricity-heat-force co-simulation of two types of software PSpice and COMSOL by adopting an indirect coupling manner.

The coupling interface of the co-simulation, which is provided by the embodiment of the present invention, comprises:
   a circuit model constructed by using a spice language in the PSpice, a thermal-mechanical model constructed by using a java language in the COMSOL and a control script file constructed in a MATLAB (Matrix Laboratory).

The step of performing electricity-heat-force co-simulation of the two types of software PSpice and COMSOL, which is provided by the embodiment of the present invention, comprises:
   performing circuit simulation of the PSpice and heat-force simulation of the COMSOL, processing data obtained by simulation by utilizing the coupling interface of the co-simulation and based on a MATLAB script program, coordinating data transfer between a circuit simulation result of the PSpice and a heat-force simulation result of the COMSOL and performing co-simulation between the PSpice and the COMSOL.

The step of performing the heat-force simulation of the COMSOL, which is provided by the embodiment of the present invention, comprises:
   constructing a heat-force model by using a java language and combining COMSOL Multiphysics 5.6 with MATLAB;
   performing COMSOL simulation by adopting a manner of saving the heat-force model as a file with a suffix of .m, and controlling a simulation process by utilizing the MATLAB; drawing a geometric figure by adopting SOLIDWORKS and importing a CAD model into the COMSOL; and setting the heat consumption rate of a heat source as a variable and updating a parameter of the heat consumption rate when in data exchange with the PSpice every time; and
   dividing grids manually, setting a steady-state type and a transient type, taking a steady-state solved result as an initial value of transient simulation, performing infinite element calculation, extracting junction temperature of the device and feeding back the junction temperature of the device into the circuit simulation.

The step of processing the data obtained by the simulation by utilizing the coupling interface of the co-simulation and based on the MATLAB script program, which is provided by the embodiment of the present invention, comprises:
   extracting simulation data of the PSpice by the MATLAB: reading and writing a spice circuit simulation program saved as a text file and written in advance by adopting a file reading and writing function by the MATLAB, so as to obtain power loss data, circuit simulation data and other data included in the text file; and screening the data by adopting a regular expression to obtain screened loss data, extracting the loss of the device corresponding to time points at equal intervals, and obtaining the average loss of each device within the time step length of data exchange by adopting a method of calculus division and summation; and
   extracting simulation data of the COMSOL by the MATLAB: setting a temperature probe to obtain a temperature data table of the device, and reading junction temperature data in the data table by using an integrated MATLAB function; and updating corresponding temperature parameters in a power device model file with a suffix of .lib through a file reading and writing command by utilizing the collected temperature data by the MATLAB.

The step of reading and writing the spice circuit simulation program saved as the text file and written in advance by adopting the file reading and writing function by the MATLAB, which is provided by the embodiment of the present invention, comprises:
   firstly, obtaining a PSpice circuit simulation input file with a suffix of .cir; controlling the input file with the suffix of .cir to be executed in PSpice AD, setting the time step lengths in the input .cir file to be equal, and performing PSpice circuit simulation; automatically generating an output file with a suffix of .out, and obtaining the power loss data corresponding to the time points at equal intervals in different devices based on the output .out file; and converting the .out file into a text file by the file reading and writing command.

The step of coordinating data transfer between the circuit simulation result of the PSpice and the heat-force simulation result of the COMSOL, which is provided by the embodiment of the present invention, comprises: transmitting the loss data obtained by calculation into the COMSOL by the MATLAB, updating the heat consumption rate of the heat source and changing a boundary condition of heat-force simulation.

Figure 2:
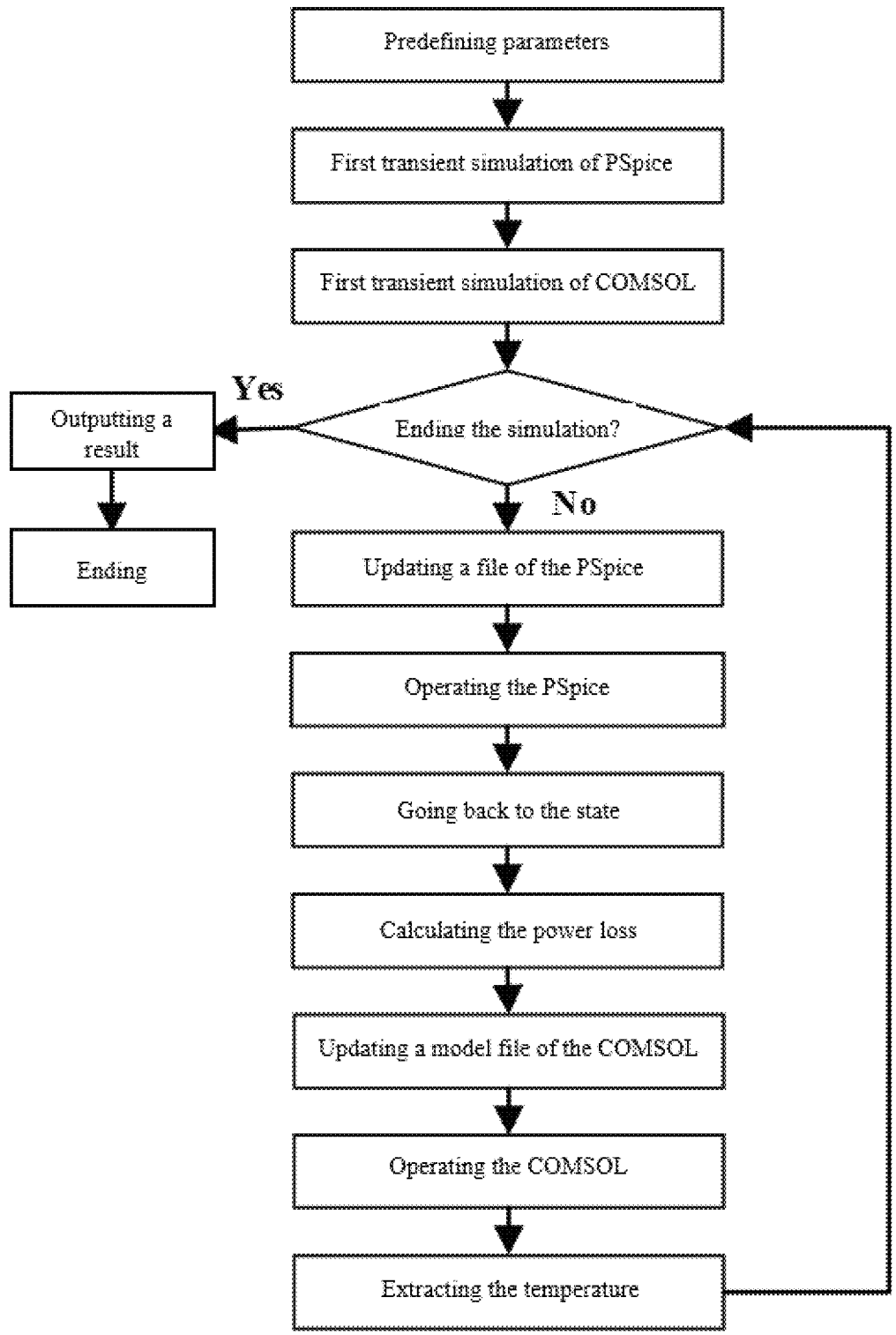
FIG. 2 is a schematic diagram of the principle of the multi-physics co-simulation method of the power semiconductor module, which is provided by the embodiment of the present invention.

As shown in FIG. 2, the step of performing the electricity-heat-force co-simulation of the two types of software PSpice and COMSOL by adopting an indirect coupling manner, which is provided by the embodiment of the present invention, comprises the following steps:

firstly, calculating the circuit model and taking the power loss of the device, which is obtained by the circuit simulation, as a boundary condition of transient heat-force simulation; next, performing the transient heat-force simulation in the COMSOL; finally, taking the junction temperature of each device, which is obtained by the heat-force simulation, as a boundary condition of next circuit simulation; and performing constant iterative loop until a condition of loop termination is met.

Figure 3:
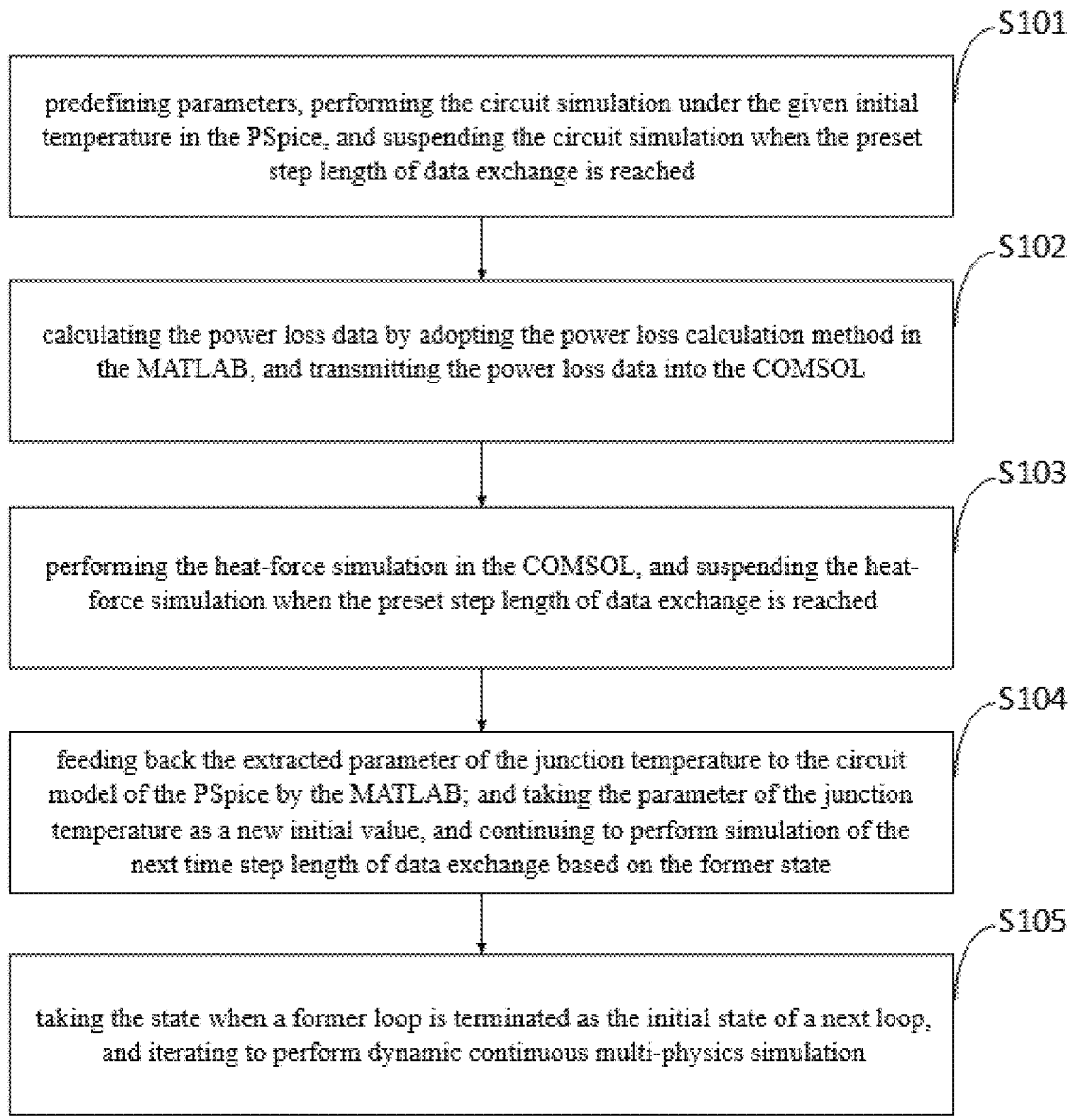
FIG. 3 is a flow chart of the multi-physics co-simulation method of the power semiconductor module, which is provided by the embodiment of the present invention.

As shown in FIG. 3, the multi-physics co-simulation method of the power semiconductor module, which is provided by the embodiment of the present invention, comprises the following steps:

S101, predefining parameters, performing the circuit simulation under the given initial temperature in the PSpice, and suspending the circuit simulation when the preset step length of data exchange is reached;

S102, calculating the power loss data by adopting the power loss calculation method in the MATLAB, and transmitting the power loss data into the COMSOL;

S103, performing the heat-force simulation in the COMSOL, and suspending the heat-force simulation when the preset step length of data exchange is reached;

S104, feeding back the extracted parameter of the junction temperature to the circuit model of the PSpice by the MATLAB; and taking the parameter of the junction temperature as a new initial value, and continuing to perform simulation of the next time step length of data exchange based on the former state; and S105, taking the state when a former loop is terminated as the initial state of a next loop, and iterating to perform dynamic continuous multi-physics simulation.

The multi-physics co-simulation method of the power semiconductor module, which is provided by the embodiment of the present invention, further comprises:

enabling the time step length of data exchange of the PSpice and the COMSOL to be equal to the time step length of data exchange of the COMSOL and the PSpice; and setting different time step lengths of data exchange to control the rate of the circuit simulation and the rate of the heat-force simulation, and performing multi-rate multi-physics coupling simulation.

The step of setting the different time step lengths of data exchange, which is provided by the embodiment of the present invention, comprises: dynamically calculating a first-order derivative of a Lagrange interpolation function of a temperature coupling variable, and dynamically adjusting the time step length of data exchange according to an adaptive adjustment strategy of the time step length.

The step of setting the different time step lengths of data exchange, which is provided by the embodiment of the present invention, comprises the following steps:

constructing a first-order variable step length three-point numerical differentiation formula based on the Lagrange function by extracting and iterating numerical solutions of temperature coupling state variables of nodes, and calculating and obtaining a first-order derivative of an interpolation function of a current node:

$$L'_n(t_i) = \frac{\lambda_i}{\lambda_{i-1}(\lambda_{i-1} + \lambda_i)}T(t_{i-2}) - \frac{\lambda_{i-1} + \lambda_i}{\lambda_{i-1}\lambda_i}T(t_{i-1}) + \frac{\lambda_{i-1} + 2\lambda_i}{\lambda_i(\lambda_{i-1} + \lambda_i)}T(t_i)$$

wherein $t_{i-2}$, $t_{i-1}$, $t_i$ represent three adjacent continuous data exchange time points; $t_i$ represents a current time node; the relational expressions: $t_{i-1}=t_{i-2}+\lambda_{i-1}$, and $t_i=t_{i-2}+\lambda_{i-1}+\lambda_i$ are met; and $T(t_{i-2})$, $T(t_{i-1})$ and $T(t_i)$ represent corresponding numerical solutions of temperature at $t_{i-2}$, $t_{i-1}$, $t_i$.

A step length adjustment strategy is established according to the first-order derivative of the interpolation function of the current node; and a step length decision interval is set as $[\varepsilon_1, \varepsilon_2]$, and step length adjustment coefficients are set as a and b respectively, wherein $a\in(0,1)$, $b\in(1,+\infty)$, and the following conditions are met:

(1) if $|L'_n(t_i)|\in[\varepsilon_1, \varepsilon_2]$, $\lambda_{i+1}=\lambda_i$;
(2) if $|L'_n(t_i)|\leq\varepsilon_1$, $\lambda_{i+1}=\lambda_i\times b$; and the time step length of data exchange is appropriately increased; and
(3) if $|L'_n(t_i)|\geq\varepsilon_2$, $\lambda_{i+1}=\lambda_i\times a$; and the step length is decreased.

The technical solutions of the present invention are further described hereinafter through combination with a specific embodiment.

Embodiment 1

1. A Multi-Physics Coupling Simulation Mechanism of the Power Semiconductor Module A coupling mechanism among multiple physical fields in the power semiconductor module is shown in FIG. 1. Through the analysis of the multi-physics coupling mechanism, it can be discovered that the key of multi-physics co-simulation among different types of software is the transfer of coupling parameters among all the physical fields. In the actual power semiconductor module, the coupling parameter which is the power loss generated by the heat source causes the temperature increase of the power semiconductor module, the temperature increase changes the characteristics of a power semiconductor of the power semiconductor module, and the change of the electrical property of a semiconductor device is caused. Additionally, as coefficients of thermal expansion among different layers of encapsulating materials of the power semiconductor module are not matched, the change of temperature also causes deformation of thermal expansion of different structures, and the mechanical thermal stress is generated. A tight coupling relationship exists between a heat field and an electrical field and between the heat field and a mechanical field. However, a coupling relationship between the mechanical field and the electrical field is weak, and the coupling between the mechanical field and the electrical field is often neglected and is considered under special situations such as high-frequency intense electromagnetic impact and the like.

Based on the analysis of the multi-physics coupling mechanism, the simulation capacity of the circuit simulation software PSpice and the simulation capacity of the infinite element simulation software COMSOL are researched. The research discovers that the COMSOL has an own thermal expansion coupling interface, multi-physics coupling simulation between the heat field and the mechanical field can be realized, but a circuit simulation module in the COMSOL has the above problems that the spice model cannot be imported into the device, etc. In order to solve the problems, the present invention adopts the professional circuit simulation software PSpice supporting the spice model to be imported into the device; and by designing the specific collaborative analysis method and performing secondary development of the software data exchange interface, the co-simulation of the two types of software PSpice and COMSOL is realized. The key of realizing the co-simulation is the transfer of the two coupling parameters of the power loss and the temperature between the PSpice and the COMSOL.

2. A Software Coupling Interface of Co-Simulation

Figure 4:
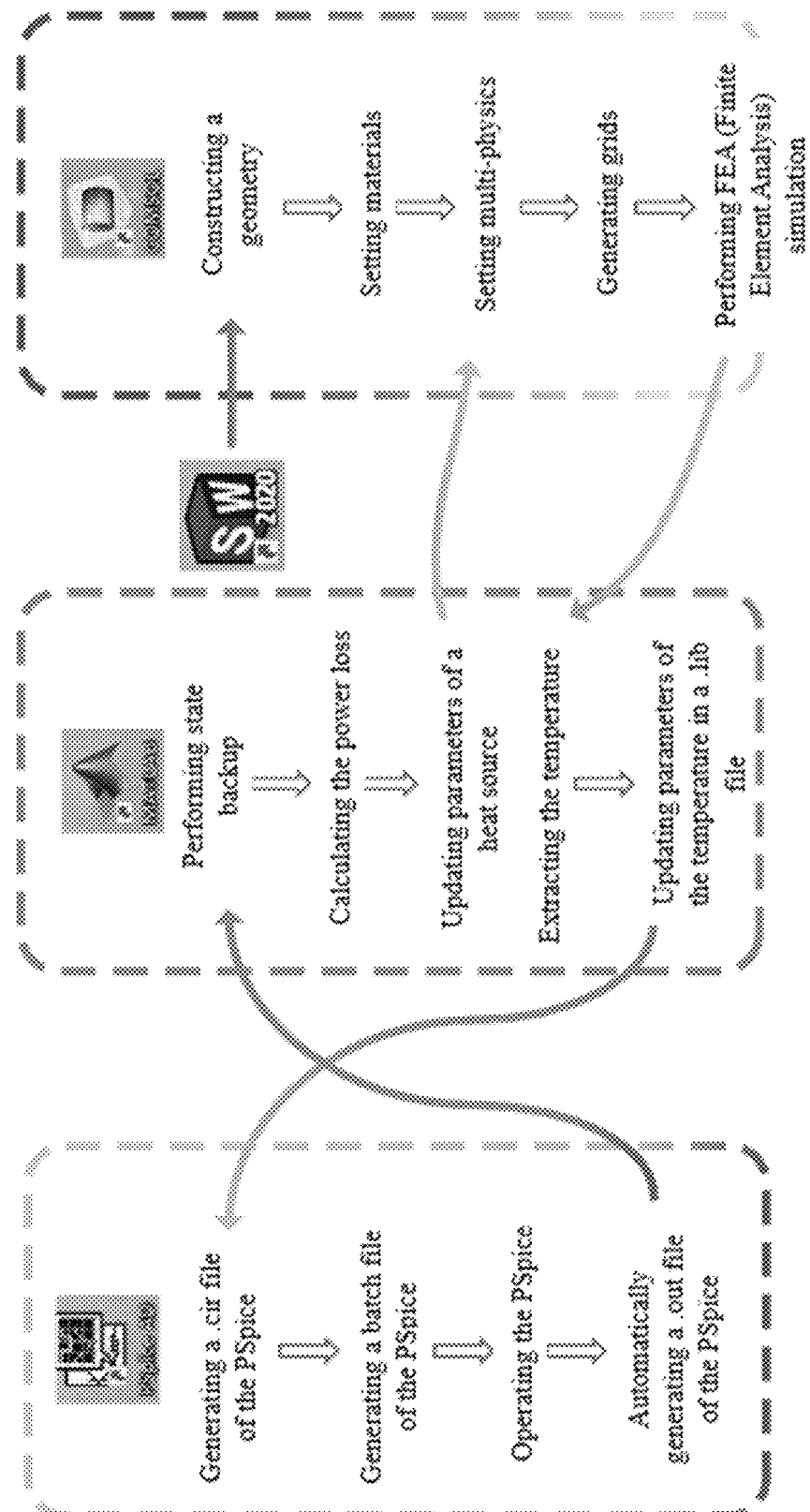
FIG. 4 is a schematic diagram of a software coupling interface of co-simulation, which is provided by the embodiment of the present invention.

The software coupling interface of co-simulation, which is proposed by the present invention, is shown in FIG. 4. The coupling interface mainly comprises three parts: a circuit model constructed by using a spice language in the PSpice, a thermal-mechanical model constructed by using a java language in the COMSOL and a control script file constructed in the MATLAB. The software coupling interface is used for processing the data obtained by the simulation by utilizing the MATLAB script program, coordinating data transfer between the circuit simulation result of the PSpice and the heat-force simulation result of the COMSOL and realizing the co-simulation between the two types of software, thereby overcoming the defects that single software is limited in simulation capacity and insufficient in simulation precision.

The step of constructing the circuit model by using the spice language in the PSpice is basically the same as the step of performing the circuit simulation by normally using a graphic interface and through manual setting, comprising construction of a circuit diagram, selection of simulation types, setting of simulation parameters, operation of circuit simulation, post-processing of the circuit simulation results and so on. A circuit refers to that the circuit simulation is programed and automated by using a spice program command instead of a manual operation step essentially. When the circuit diagram is constructed, the influence of non-ideal circuit parameters on the circuit simulation results needs to be considered as far as possible. It can be known from the knowledge of the circuit that: the non-ideal parameter of a drive loop, which is the parasitic inductance, has great influence on the power loss of the device in the power semiconductor module. In order to achieve the simulation accuracy, a parasitic parameter in the power semiconductor module needs to be extracted by using Ansys Q3D, and then the parasitic inductance of the drive loop, which is obtained by extraction, is taken as a lumped parameter. In the selection of the simulation types, as data exchange needs to be performed with the COMSOL at a specific time point subsequently to realize the multi-physics coupling simulation, a most common transient simulation type is selected. In the setting of the simulation parameters, as the simulation step length needs to be adaptively adjusted, the transient simulation time needs to be set as a variable; and every transient simulation time is updated while in data exchange every time. When the data is processed and exchanged after the operation of the circuit simulation, as the PSpice and the COMSOL are two types of heterogeneous software and have no software interaction interface, the COMSOL cannot be used for directly processing and extracting the circuit simulation data. In order to realize data exchange between the PSpice and the COMSOL, the present invention adopts the MATALB as third-party software, which serves as a bridge to collaborate the exchange of the simulation data between the two types of software. However, no ready-made usable software interface is between the PSpice and the MATALB to realize data exchange between the PSpice and the MATALB. For the difficulty, process control and data processing on the PSpice can be realized by the MATALB by writing a software interface program by virtue of the strong data processing capability and algorithm development capability of the MATALB. The key of writing the co-simulation interface program of the PSpice and the MATALB is processing of various input and output formatted files. The MATALB is configured to read and write the spice circuit simulation program saved as the text file and written in advance by adopting the file reading and writing function: firstly, the PSpice circuit simulation input file with the suffix of .cir is obtained; then, the input file with the suffix of .cir is controlled to be executed in the PSpice AD, and the PSpice circuit simulation is performed; when the circuit simulation is performed by using the PSpice, in order to be convenient for processing the loss data by using the MATALB subsequently, the time step lengths in the input .cir file need to be set as equal lengths; after the circuit simulation program is executed in the PSpice, the output file with the suffix of .out is automatically generated, and the power loss data corresponding to the time points at equal intervals in different devices can be obtained in the output .out file; and when the power loss data is processed, as the output .out file cannot be read and written by the MATLAB directly, the .out file needs to be converted into the text file by the file reading and writing command. The obtained text file comprises the power loss data and further comprises some other data obtained by the circuit simulation. In order to be convenient for the MATLAB to read out power loss results corresponding to all the time points, the loss data is screened out alone by adopting the regular expression. After the loss of the device corresponding to the time points at equal intervals is extracted, the average loss of each device within the time step length of data exchange is obtained by adopting the method of calculus division and summation. The MATLAB is configured to transmit the calculated loss data into the COMSOL, the parameter which is the heat consumption rate of the heat source is updated, and the boundary condition of the heat-force simulation is changed.

When the heat-force model is constructed by using the java language in the COMSOL, the COMSOL Multiphysics 5.6 with MATLAB, which is a ready-made software interface of the COMSOL and the MATLAB, can be used. Every simulation operation step performed in the COMSOL can be implemented by adopting a manner of saving the heat-force model as the file with the suffix of .m, and a program command which corresponds to every operation step and is in a Java language form is obtained in the MATLAB, so that the whole heat-force multi-physics simulation process is controlled by the MATLAB. The heat-force multi-physics simulation process mainly comprises: selecting a multi-physics coupling module (a solid-fluid heat transfer module, a laminar flow/turbulent flow module and a structural mechanics module), drawing or importing the CAD geometric model, defining a material attribute of a geometry, setting the heat source and other boundary conditions, dividing grids, setting research types, performing finite element calculation and solution and post-processing the simulation results. The multi-physics coupling module is configured to select laminar flow/turbulent flow to accurately simulate the cooling effect under the effect of a flow control device such as a fan and the like in air cooling and liquid cooling and sufficiently simulate coupling between fluid and heat transfer, so as to improve the accuracy of thermal simulation. In the present invention, the geometric figure is drawn by adopting SOLIDWORKS, and the CAD model is imported into the COMSOL. When in the setting of the heat consumption rate of the heat source, which is similar to the PSpice, the heat consumption rate of the heat source needs to be set as the variable, and the parameter of the heat consumption rate is updated when in data exchange with the PSpice every time. The grids are divided manually, rather than automatically by adopting simple software, and both the precision and efficiency of infinite element simulation are balanced. When in the setting of the research types, in consideration of the problem that the convergence of solution of the fluid-heat transfer simulation is poor, the steady-state type and the transient type are set, the steady-state solved result is taken as the initial value of transient simulation, so as to improve the convergence of simulation. After the infinite element calculation and solution is completed, the junction temperature of the device needs to be extracted and fed back into the circuit simulation. Being different from that multiple file reading and writing operations need to be performed when the PSpice simulation data is extracted by the MATLAB, when the COMSOL simulation data is extracted by the MATLAB, the temperature probe is set to obtain the temperature data table of the device, and the junction temperature data in the data table is read by using the integrated MATLAB function; and the corresponding temperature parameters in the power device model file with the suffix of .lib are updated through the file reading and writing command by utilizing the collected temperature data by the MATLAB.

3. A Co-Simulation Coupling Strategy

Since the circuit model and the heat-force model of the power semiconductor module are constructed by different types of simulation software respectively, the electricity-heat-force co-simulation is realized by adopting an indirect coupling manner. Through comparison of the flow chart 2 and a direct coupling manner of the single software, the indirect coupling method proposed by the present invention comprises: firstly, solving the circuit model and taking the power loss of the device, which is obtained by the circuit simulation, as the boundary condition of the transient heat-force simulation; then, completing the transient heat-force simulation in the COMSOL; and finally, taking the junction temperature of each device, which is obtained by the heat-force simulation, as the boundary condition of next circuit simulation. The constant iterative loop is performed until the condition of loop termination is met. All the processes are realized by the programs, so as to realize automated co-simulation.

Figure 5:
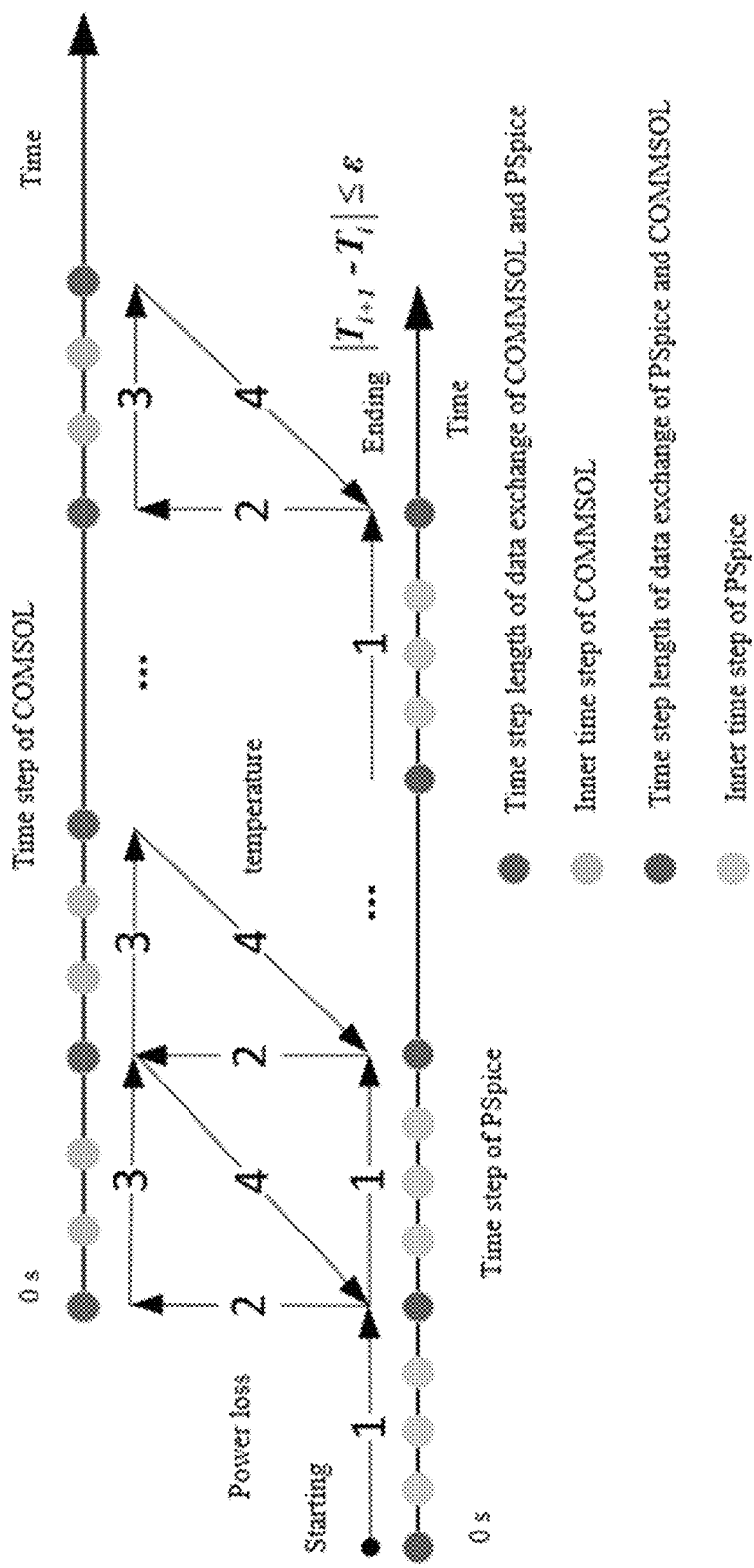
FIG. 5 is a schematic diagram of an indirect bidirectional coupling strategy provided by the embodiment of the present invention.

An indirect bidirectional coupling strategy adopted by the present invention is shown in FIG. 5. In the coupling strategy, the time step length of data exchange of the PSpice and the COMSOL is equal to the time step length of data exchange of the COMSOL and the PSpice. As the action time of all physical fields in the power semiconductor module is equal, the time step lengths in the corresponding transient simulation every time need to be set as equal lengths in the two types of software. However, the inner time step length of the PSpice is far less than the inner time step length of the COMSOL. As the transient time scale of switching of the device is at the µs level, in order to ensure accurate simulation of a switching behavior and the power loss of the device, the simulation step length of the ns level needs to be set in the PSpice. The time scale of heat transfer is at the ms level, and the time step length of the ms level in the COMSOL is enough for performing high-precision heat-force simulation. For different research problems, different time step lengths of data exchange can be set to control the rate of the circuit simulation and the rate of the heat-force simulation, so as to realize multi-rate multi-physics coupling simulation. In the simulation that the time scale is very short, such as in the multi-physics simulation when the power semiconductor module is short-circuited, the characteristics of electricity, heat and force of the power semiconductor module are changed dramatically in a short time, and the time step length of data exchange needs to be set at the ms level. In the heat-force simulation that the time scale is long, in order to obtain good balance between calculation precision and efficiency, even the time step length of data exchange of the s level can be adopted. Through adoption of the indirect bidirectional coupling strategy, the simulation precision and efficiency can be balanced, so as to realize the accurate simulation of the dynamic heat transfer characteristics and electric characteristics of the power semiconductor module.

In the dynamic continuous simulation of the heat transfer characteristics and the electric characteristics, a MATLAB script needs to be used for controlling the sequence of simulbation processes in the PSpice and the COMSOL. Four steps in the simulation processes are taken as one iterative loop: step 1, performing the circuit simulation under the given initial temperature in the PSpice, and suspending the circuit simulation when the preset step length of data exchange is reached; step 2, calculating the power loss data by adopting the power loss calculation method in the MATLAB, and transmitting the power loss data into the COMSOL; step 3, performing the heat-force simulation in the COMSOL, and suspending the heat-force simulation when the preset step length of data exchange is reached; and step 4, feeding back the extracted parameter of the junction temperature to the circuit model of the PSpice by the MATLAB; and taking the parameter of the junction temperature as the new initial value, and continuing to perform the simulation of the next time step length of data exchange based on the former state. The state when the former loop is terminated is taken as the initial state of the next loop, so as to be a dynamic iterative process and realize dynamic continuous multi-physics simulation.

According to the method proposed by the present invention, the transient and steady-state full conditions co-simulation between different types of software can be realized. Specifically, in the research of the transient problem, the dynamic iterative process is terminated after the set number of iterations is reached. In the research of the steady-state simulation, when the temperature difference of a power device between two adjacent transient iterative processes is less than a predefined threshold, the termination of the steady-state simulation is reached is determined. For the problem of transient field coupling of the power semiconductor module, which is researched by the present invention, as all the physical fields are constantly changed in time domains, all the physical fields need to be analyzed according to the transient state when decoupling analysis is performed on the physical fields. The steady-state simulation between the two types of software approaches the steady state through continuous transient simulation essentially; and when the temperature of the device is not changed any longer, the transient simulation is terminated, so as to obtain simulation results of electricity, heat and force of the power semiconductor module at the steady state.

4. Adaptive Step Length Adjustment

Unbalanced load residuals exist in all transient steps, and too large unbalanced load residuals endanger the convergence of numerical integration. When the research of the steady-state simulation of the two types of software is performed by using the co-simulation method proposed by the present invention, the setting of the time step length of data exchange of interface software is a very important problem, which has a close relation with the co-simulation precision and efficiency. When the selected step length of data exchange is small enough, although the solving precision and stability can be ensured, the smaller step length of data exchange causes more number of iterations, and the solving efficiency is low; and when the larger step length of data exchange is adopted, although the number of iterations can be decreased, as the coupling effects of other physical fields are neglected when the problem of a certain physical field is solved within the interval of the step length of data exchange, a greater truncation error is caused possibly. In conclusion, the fixed step length of data exchange is difficult to obtain the balance between the simulation precision and the simulation efficiency. How to determine the step length of data exchange efficiently and reasonably is the problem to be solved urgently by the present invention.

The present invention provides an adaptive step length coupling analysis method based on the numerical solutions of the temperature coupling state variables, and the first-order variable step length three-point numerical differentiation formula based on the Lagrange function is constructed by extracting and iterating the numerical solutions of the temperature coupling state variables of the nodes. The temperature coupling state variable $T_i$ is selected as a tracking object, and the corresponding numerical solutions of temperature at the three adjacent continuous data exchange time points $t_i$, $t_{i+1}=t_i+\lambda_i$ and $t_{i+2}=t_i+\lambda_{i+1}+\lambda_{i+2}$ are $T(t_i)$, $T(t_{i+1})$ and $T(t_{i+2})$. A quadratic Lagrange interpolating polynomial is constructed according to three adjacent nodes, and derivation is performed to obtain the following formula:

$$L'_n(t_i) = \frac{(t-t_{i+1})+(t-t_{i+2})}{\lambda_{i+1}(\lambda_{i+1}+\lambda_{i+2})}T(t_i) - \frac{(t-t_i)+(t-t_{i+2})}{\lambda_{i+1}\lambda_{i+2}}T(t_{i+1}) + \frac{(t-t_i)+(t-t_{i+1})}{\lambda_{i+2}(\lambda_{i+1}+\lambda_{i+2})}T(t_{i+2}) \quad (1)$$

The moment $t_{i+2}$ is selected as the current node and is substituted into the formula (1), and i=i+2, so that a first-order variable step length differential formula is obtained:

$$L'_n(t_i) = \frac{\lambda_i}{\lambda_{i-1}(\lambda_{i-1}+\lambda_i)}T(t_{i-2}) - \frac{\lambda_{i-1}+\lambda_i}{\lambda_{i-1}\lambda_i}T(t_{i-1}) + \frac{\lambda_{i-1}+2\lambda_i}{\lambda_i(\lambda_{i-1}+\lambda_i)}T(t_i) \quad (2)$$

The first-order derivative of the interpolation function of the current node is solved according to the formula (2), and the step length adjustment strategy is established according to the first-order derivative of the interpolation function of the current node; and the step length decision interval is set as $[\varepsilon_1, \varepsilon_2]$, and the step length adjustment coefficients are set as a and b respectively, wherein $a \in (0,1)$, $b \in (1,+\infty)$, and the following conditions are met:

(1) if $|L'_n(t_i)| \in [\varepsilon_1, \varepsilon_2]$, $\lambda_{i+1}=\lambda_i$;
(2) if $|L'_n(t_i)| \leq \varepsilon_1$, $\lambda_{i+1}=\lambda_i \times b$; and at the moment, the temperature is changed gently, and the unbalanced load residual is smaller, so that the time step length of data exchange can be appropriately increased to improve the solving efficiency; and
(3) if $|L'_n(t_i)| \geq \varepsilon_2$, $\lambda_{i+1}=\lambda_i \times a$; and at the moment, the temperature is changed dramatically, and the tiny change of the step length possibly causes the larger unbalanced load residual, so that the step length is decreased to ensure the solving precision.

When the iterative analysis is performed, the first-order derivative of the Lagrange interpolation function of the temperature coupling variable is solved dynamically, and the time step length of data exchange is adjusted dynamically according to the adaptive adjustment strategy of the time step length.

5. An Example of the Co-Simulation of the Power Semiconductor Module

Figure 6:
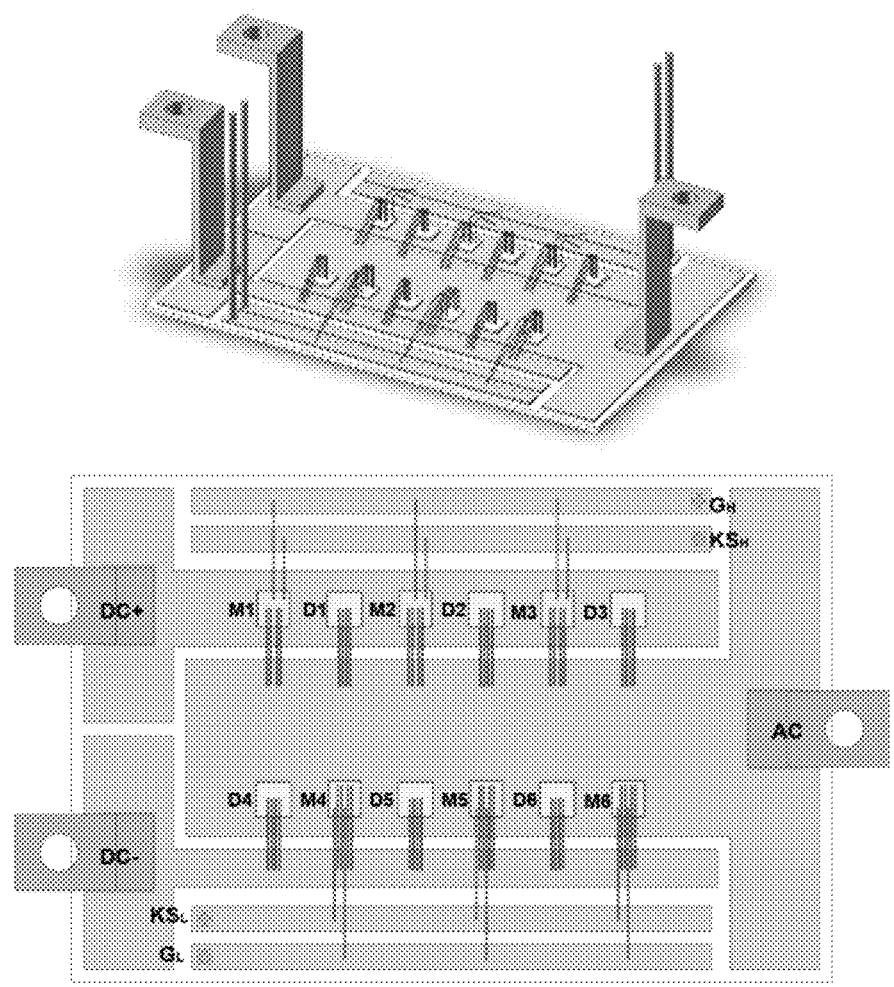
FIG. 6 is a schematic diagram of a SiC power semiconductor module provided by the embodiment of the present invention.
Figure 7:
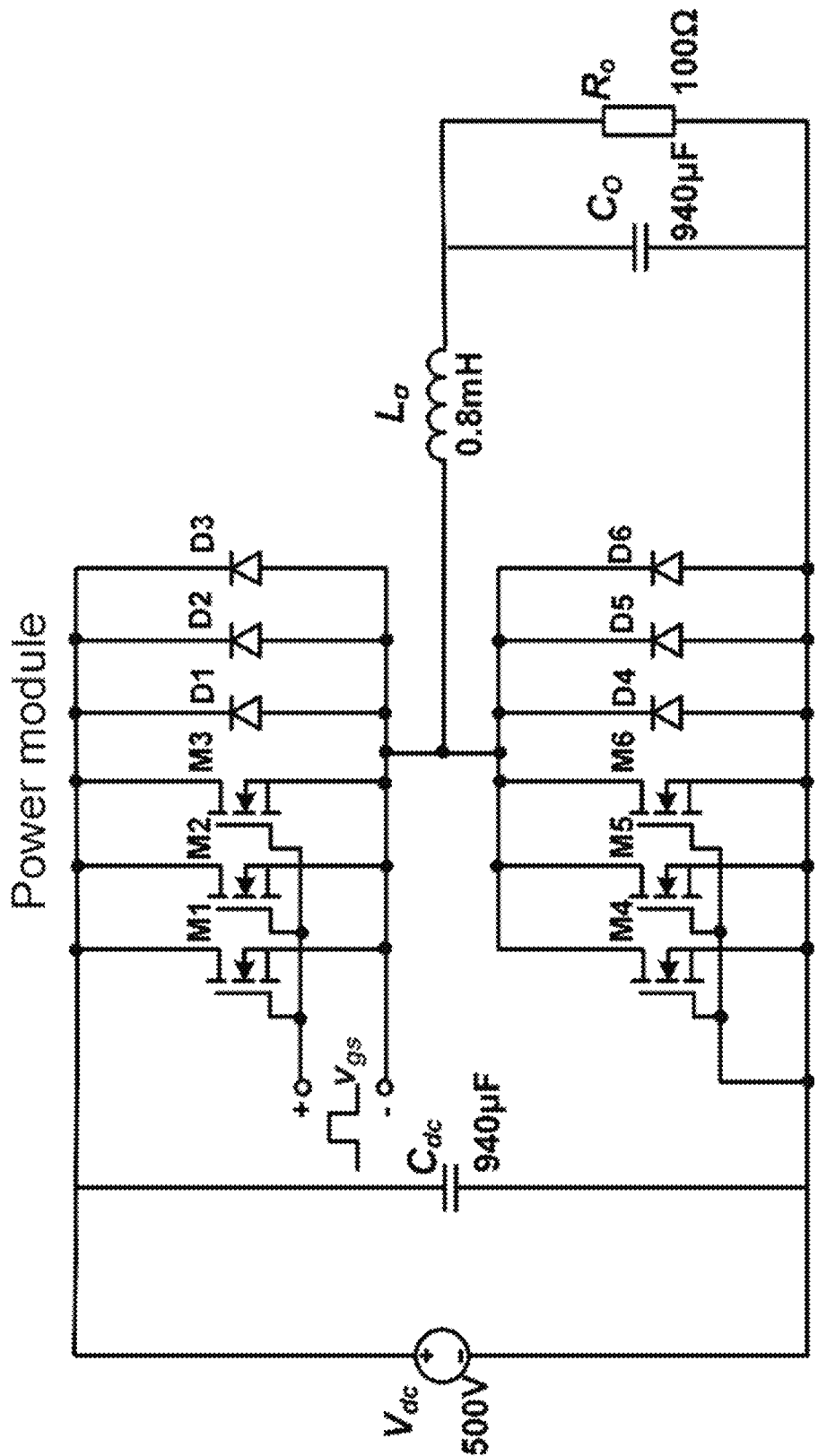
FIG. 7 is a schematic diagram of a circuit simulation model of a buck converter, which is provided by the embodiment of the present invention.

A SiC power semiconductor module shown in FIG. 6 is established. Power devices used in the module are SiC MOSFET (Metal-Oxide-Semiconductor Field Effect Transistor) CPM312000075A and SiC SBD CPW41200S015B from the CREE Company. Three MOSFETs and three Schottky FWDs (Fly-Wheel Diodes) are in parallel connection at the position of each switch. A circuit simulation model of a buck converter, which is shown in FIG. 7, is established by using a spice language program in PSpice AD. The buck converter works under the conditions of 500V of DC (Direct Current) input voltage, 4 A of load current, 100 kHz of switching frequency, 0.8 of duty ratio and 10Ω of driving resistance. The initial temperature of the circuit simulation is set as 20° C. A heat-force model of the power semiconductor module is established by using a java program in the COMSOL. In consideration of the balance of the precision and the efficiency, the inner time step length of the circuit simulation and the inner time step length of the heat-force simulation are set as 1 ns and 100 ms respectively. The initial step length of data exchange between the two simulation models is set as 1 s.

Figure 8:
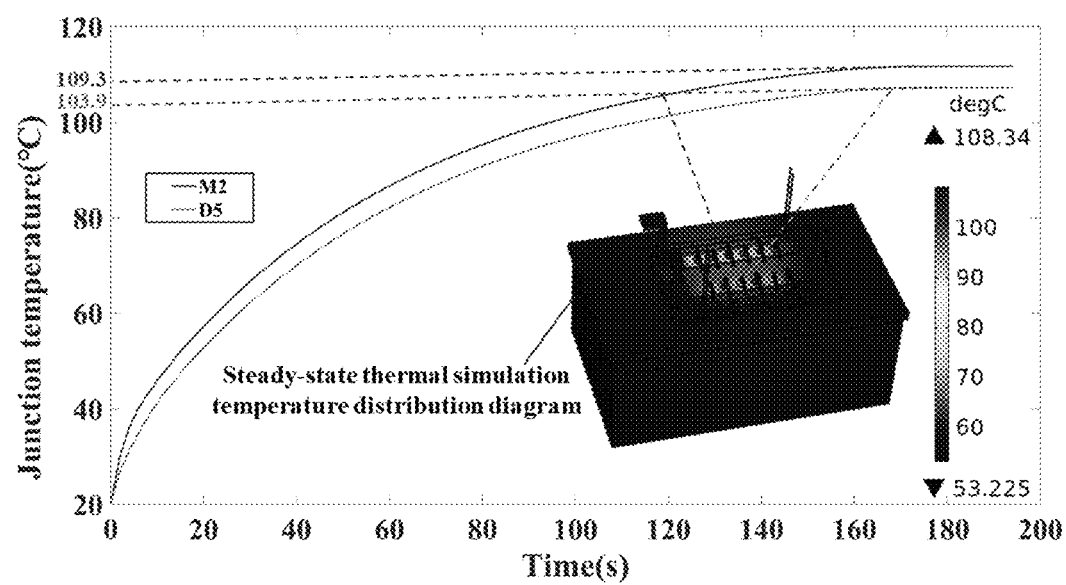
FIG. 8 is a comparison diagram of changing processes of junction temperature of devices, which are obtained by the multi-physics co-simulation method provided by the embodiment of the present invention, and a steady-state junction temperature distribution diagram obtained by direct steady-state thermal simulation.
Figure 9:
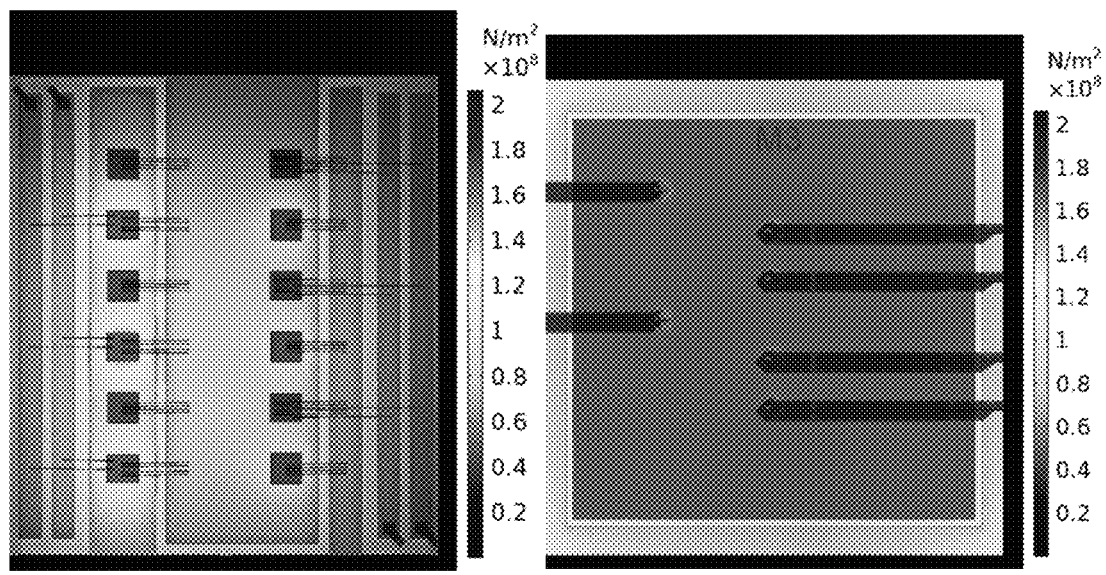
FIG. 9 is a schematic diagram of steady-state stress distribution of multi-physics, which is provided by the embodiment of the present invention.

A comparison diagram of changing processes of junction temperature of the devices, which are obtained by using the multi-physics co-simulation method provided by the present invention, and a steady-state junction temperature distribution diagram obtained by direct steady-state thermal simulation is shown in FIG. 8. The steady-state power loss of the device, which is calculated by the co-simulation method, is taken as an input parameter of the direct steady-state thermal simulation. An upper curve and a lower curve respectively represent the changing processes of temperature along with the time on chips M2 and D5 in the co-simulation process. Through the co-simulation, the obtained steady-state temperature of the M2 and D5 is 109.3° C. and 103.9° C. respectively. The steady-state temperature distribution diagram of the power semiconductor module, which is obtained by adopting the direct steady-state thermal simulation method, is at the bottom right of the two curves. Through the direct steady-state thermal simulation, the obtained junction temperature of the SiC MOSFET M2 and the diode D5 is 108.3° C. and 103.1° C. respectively. It can be known from the comparison that the difference of the junction temperature of simulation results obtained by the two simulation methods is less than 1° C., which verifies the feasibility of using the co-simulation method. The steady-state stress distribution of multi-physics is shown in FIG. 9. It can be seen from the figure that higher stress exists at a welding layer and a bonding wire. In order to improve the reliability of the power semiconductor module, solder and the bonding wire that are high in reliability can be selected.

What is claimed is:

1. A multi-physics co-simulation method of a power semiconductor module, comprising the following steps:
   step 1, predefining parameters, performing a circuit simulation under a given initial temperature in a PSpice, and suspending circuit simulation when a preset step length of data exchange is reached;

step 2, calculating a power loss data by adopting a power loss calculation method in a MATLAB, and transmitting power loss data into a COMSOL;

step 3, performing a heat-force simulation in the COMSOL, and suspending heat-force simulation when the preset step length of data exchange is reached;

step 4, feeding back an extracted parameter of a junction temperature to a circuit model of the PSpice by the MATLAB; and taking the parameter of junction temperature as a new initial value, and continuing to perform simulation of a next time step length of data exchange based on a former state;

step 5, taking a state when a former loop is terminated as the initial state of a next loop, iterating to perform dynamic continuous multi-physics simulation, and terminating co-simulation when an iteration termination condition is met;

wherein the multi-physics co-simulation method of the power semiconductor module further comprises: enabling a time step length of data exchange of the PSpice and the COMSOL to be equal to the time step length of data exchange of the COMSOL and the PSpice; and setting different time step lengths of data exchange to control a rate of the circuit simulation and a rate of the heat-force simulation, and performing multi-rate multi-physics coupling simulation;

the step of setting the different time step lengths of data exchange comprises the following steps:

constructing a first-order variable step length three-point numerical differentiation formula based on a Lagrange function by extracting and iterating numerical solutions of temperature coupling state variables of nodes, and calculating and obtaining a first-order derivative of an interpolation function of a current node:

$$L'_n(t_i) = \frac{\lambda_i}{\lambda_{i-1}(\lambda_{i-1} + \lambda_i)} T(t_{i-2}) - \frac{\lambda_{i-1} + \lambda_i}{\lambda_{i-1}\lambda_i} T(t_{i-1}) + \frac{\lambda_{i-1} + 2\lambda_i}{\lambda_i(\lambda_{i-1} + \lambda_i)} t(t_i)$$

wherein $t_{i-2}$, $t_{i-1}$, $t_i$ represent three adjacent continuous data exchange time points; $t_i$ represents a current time node; the relational expressions: $t_{i-1}=t_{i-2}+\lambda_{i-1}$, and $t_i=t_{i-2}+\lambda_{i-1}+\lambda_i$ are met; $T(t_{i-2})$, $T(t_{i-1})$ and $T(t_i)$ represent corresponding numerical solutions of temperature at $t_{i-2}$, $t_{i-1}$, $t_i$; and $\lambda_i$ and $\lambda_{i-1}$ represent time step lengths;

a step length adjustment strategy is established according to the first-order derivative of the interpolation function of the current node; and a step length decision interval is set as $[\varepsilon_1, \varepsilon_2]$, and step length adjustment coefficients are set as a and b respectively, wherein $a \in (0,1)$, $b \in (1,+\infty)$, and the following conditions are met:

(1) if $|L'_n(t_i)| \in [\varepsilon_1, \varepsilon_2]$, $\lambda_{i+1}=\lambda_i$;

(2) if $|L'_n(t_i)| \leq \varepsilon_1$, $\lambda_{i+1}=\lambda_i \times b$; and a time step length of data exchange is appropriately increased; and (3) if $|L'_n(t_i)| \geq \varepsilon_2$, $\lambda_{i+1}=\lambda_i \times a$; and a step length is decreased.

2. An information data processing terminal, comprising a memory and a processor, wherein a computer program is stored in the memory; and when the computer program is executed by the processor, the processor is configured to execute the multi-physics co-simulation method of the power semiconductor module of claim 1.

3. A non-transitory computer readable storage medium, storing a computer program, wherein when the computer program is executed by a processor, the processor is enabled to execute the multi-physics co-simulation method of power semiconductor module according to claim 1.

\* \* \* \* \*